Feb. 26, 1963 H. GLAZENBURG 3,079,241
APPARATUS AND PROCESS FOR THE CHURNING OF COAGULATED SKIM MILK
Filed Jan. 18, 1960 2 Sheets-Sheet 1
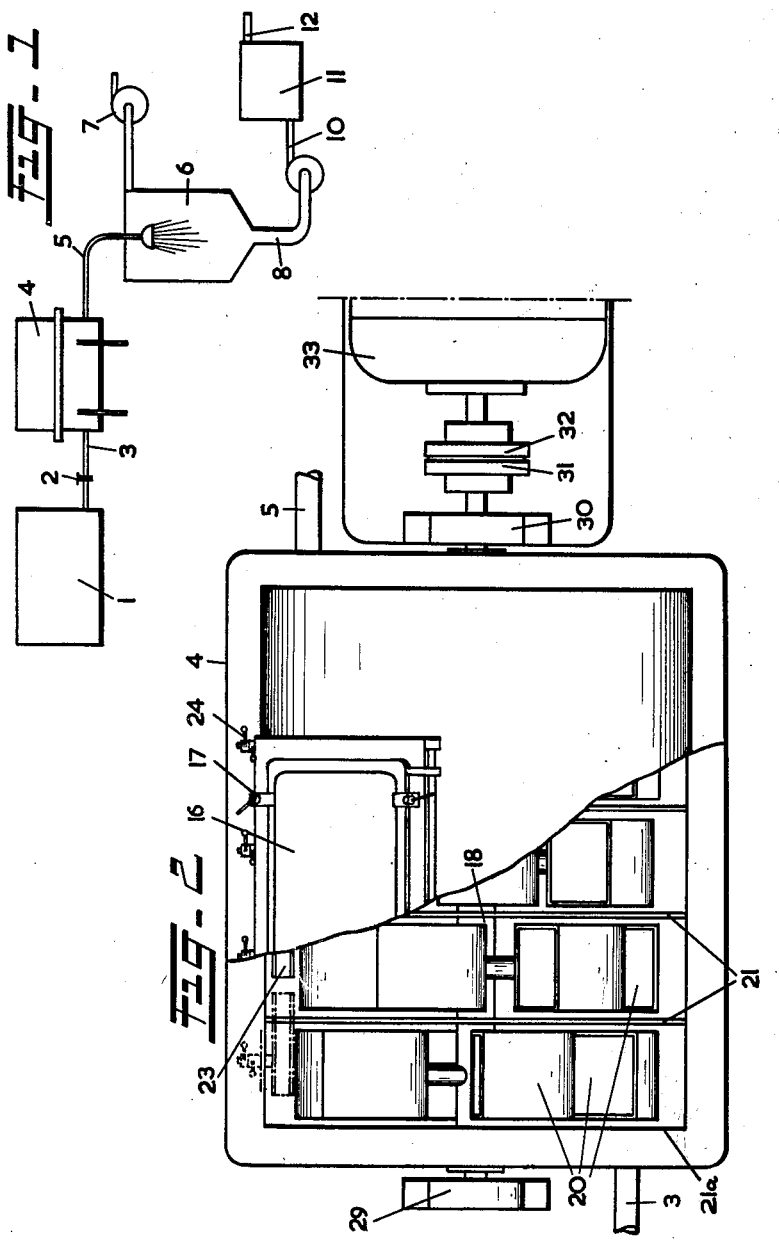
INVENTOR.
HILKO GLAZENBURG
BY
Wenderoth, Lind & Ponack
Attys.

INVENTOR.
HILKO GLAZENBURG

United States Patent Office 3,079,241
Patented Feb. 26, 1963

3,079,241
APPARATUS AND PROCESS FOR THE CHURNING OF COAGULATED SKIM MILK
Hilko Glazenburg, Haarlem, Netherlands, assignor to N.V. Sterovita Melkproducten, Amsterdam, Netherlands, a corporation of the Netherlands
Filed Jan. 18, 1960, Ser. No. 9,151
3 Claims. (Cl. 31—89)

The present invention relates to an apparatus and a process for the production of cultured butter milk and more particularly to an apparatus and a process for the churning of skim milk to produce such buttermilk.

It is known to carry out the churning process intermittently. In said known process a certain amount of skim milk is introduced into a churning device and is churned for a certain time. The churning device conventionally used in the art comprises a substantially closed vessel provided with stirring means. Actual practice has shown that the product resulting from a churning process thus carried out is non-uniform. This phenomenon is to be attributed to the circumstance that in a churning device of the known type not all of the milk is subjected to the churning process in the same manner.

Although attempts have been made to overcome the foregoing difficulties, none as far as I am aware, was entirely successful.

The invention in its broad aspects contemplates the provision of a number of churn units, through which the skim milk to be churned is passed successively. I have discovered that when the milk to be churned is each time poured into a successive churn unit such a diversity in the treatment of and in the action on the milk takes place that ultimately all the milk will have undergone a substantially similar and complete churning treatment.

In accordance with a preferred embodiment a number of churn units are combined into an apparatus.

It is an object of the present invention to provide an apparatus for use in a continuously operating installation for the preparation of cultured butter milk.

Another object of the present invention is to provide an apparatus of this type in which the residence time of the milk in the churning apparatus is controllable with a wide range.

The invention also contemplates providing a method for the churning of skim milk, in which said milk is successively passed through a number of churn units.

It is also the purpose of the invention to provide a method and an apparatus which when used in an installation for the production of cultured butter milk will yield a product which also as regards its acidity is stable.

With the foregoing and other objects in view the invention resides in the novel arrangement and combination of parts and in the novel method and combination of measures hereinafter described and claimed; it being understood that changes in the precise embodiment of the invention herein disclosed may be made within the scope of what is claimed without departing from the spirit of the invention.

Other objects and advantages will become apparent from the following description taken in conjunction with the accompanying drawings in which:

FIGURE 1 schematically shows an installation for the production of cultured butter milk, of which installation the churning apparatus forms part;

FIGURE 2 shows a plan view, on an enlarged scale, of the churning apparatus, a portion of the casing of the apparatus being cut away;

Figure 3:
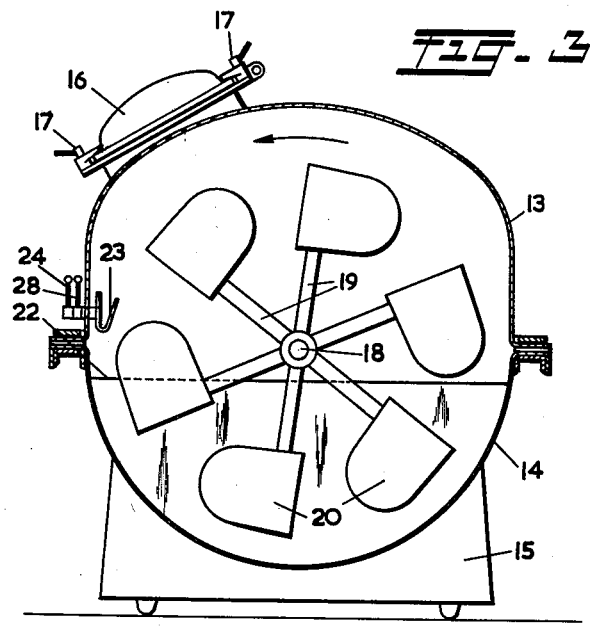
FIGURE 3 shows a vertical section of the churning apparatus.

In the schematic FIGURE 1 reference numeral 1 designates a container in which an amount of skim milk is introduced, which skim milk has been slightly heated. To said skim milk an amount of inoculating material is added whereupon the coagulation of the milk sets in. When a certain acidity has been reached the churning process may start. For said purpose a stopvalve 2 provided in a conduit 3, is opened, through which conduit the coagulated milk slowly flows to the churning apparatus 4. From the churning apparatus 4, which will be described hereinafter in greater detail, the churned milk flows through a conduit 5 to a vacuum chamber 6 to which an exhauster 7 is connected. The air which during the churning process has been absorbed by liquid is removed by the exhauster 7. Via a conduit 8 the liquid is withdrawn from the vacuum chamber 6 by a pump 9 and is subsequently passed through a conduit 10 to a cooler 11. The butter milk which is ready then leaves the cooler through a conduit 12.

More particularly referring to FIGURES 2 and 3 the churning apparatus will now be described in greater detail.

Figure 4:
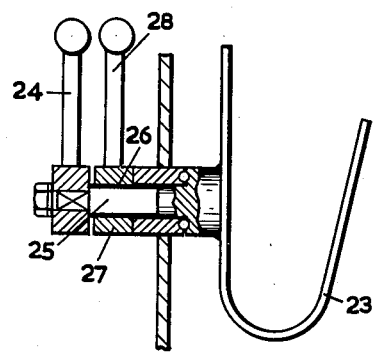
FIGURE 4 is an enlarged view of an overflow gutter with parts shown in section.

The two-piece casing of the churning apparatus comprises an upper portion 13 and a lower portion 14, which is supported by a frame 15. The upper portion 13 is provided with a manhole which can be closed by means of a lid 16. The lid 16 may be secured by means of a number of screw bolts 17. A shaft 18 extends along the longitudinal axis of the casing. On the shaft are mounted five radially extending groups with six supporting means in the form of spokes 19 in each group. These five groups are so mounted on the shaft 18 that the spokes in one group are circumferentially staggered with respect to the spokes in the other groups. Each of the spokes 19 carries a bucket 20. The direction of rotation of the shaft 18 and of the means 19 and 20 secured thereto is indicated by an arrow in FIGURE 3. All of the buckets 20 are so arranged that they are open in the direction of rotation. Between each adjacent set of spokes 19 a substantially semi-circular partition 21 is interposed, which extends upwardly from the bottom of the casing and ends in a horizontal edge 22 which is located a short distance beneath the shaft 18. Each set of spokes 19 and of buckets 20 resp. will, therefore, move through a substantially semi-circular compartment, when the shaft 18 is rotated, said compartment being each time formed either by two partitions 21 or by a partition 21 and an end wall 21a of the casing. Against the inner wall of the upper portion 13 of the casing a number of gutters 23 is provided, one above each partition 21, so that in total there are four gutters. Said gutters 23, as appears from FIGURE 4, may be turned relative to the wall of upper portion 13 of the casing by means of a handle 24, which is secured to a shaft 25 which in turn is secured to the gutter 23. The shaft 25 is provided with screw thread 26 on which a lock-nut 27 is threaded, which may be operated by means of a handle 28.

After loosening the lock-nut 27 the associated gutter 23 may be adjusted to an inclined position by means of the handle 24, whereupon the gutter may be secured in said position by tightening the lock-nut by means of the handle 28.

As appears from FIGURE 2 a short part of each gutter 23 as seen in vertical projection is located to the right of a partition 21 and a longer part of the gutter is located to the left of the same partition.

In the arrangement according to FIGURE 2, the end of the shorter part of the gutter 23, will generally be located at a somewhat lower level than the end of the longer part. If, therefore, liquid is poured into said longer part of the gutter it will run towards the shorter part owing to the inclined position of the gutter and flow down into the adjacent compartment.

The shaft 18 is supported by two bearings 29 and 30 and is connected by means of a coupling 31, 32 with a driving means 33 which has only been partly shown.

I shall now proceed to a further discussion of the operation of the churning apparatus, while at the same time an example will be discussed.

In the first compartment, located farthest to the left in FIGURE 2 an amount of milk to be churned will flow via a conduit 3. Said milk consists of skim milk having a fat content of 1%, which milk has been heated to 21° C. and has been inoculated with a suitable bacterial flora. The amount of inoculating material added amounts to 1%, while the acidification took about 20 hours. Thereupon an acidity of 0.91% lactic acid had been reached.

The thus coagulated milk fills the first compartment for the larger part and meanwhile the shaft 18 has been set rotating. The buckets 20 belonging to the first compartment are successively moved through the liquid and will each time be filled when they are submerged below the level of the liquid. The amount of liquid raised in each bucket is again poured out during the gradual tipping over of the bucket, so that a very intimate mixing of the entire amount of liquid takes place. Because each time a rather large amount of liquid is temporarily taken out of the compartment there is no possibility that in certain portions of the compartment in which the stirring takes place liquid will remain more or less stagnant and will not or hardly take part in the churning process, which possibility exists in conventional churns provided with stirring means. During the repeated emptying of the buckets 20 each time a portion of the milk will be poured into the gutter 23 associated with the compartment. The liquid poured into said gutter will flow through the gutter to the adjacent compartment, because of the inclined position of the gutter.

Seeing that this liquid is continuously discharged from the first compartment liquid will likewise be continuously and at the same rate supplied to the first compartment via conduit 3. All of the liquid which accumulates in the second compartment will have entered said compartment via a gutter 23. Said liquid has successively flown into the second compartment, which in itself is a reason that the liquid will again be distributed throughout the second compartment and will, therefore, again be mixed entirely anew.

In the second compartment the rotating buckets will subject the milk to the same treatment as did the buckets in the first compartment. Naturally the same applies to the third and the following compartments. It will be clear that according as the gutters 23 occupy a more or less inclined position, the displacement of the liquid through the gutters will take place more quickly or more slowly and that, therefore, according as the gutters occupy a more inclined position the residence time of the liquid in the entire apparatus will become shorter. Seeing that liquid is continuously added to and continuously discharged from the apparatus, the apparatus may form part of a continuously operating installation.

On an average the time of residence of the liquid in the churning apparatus amounts to about 20 minutes. The advantage of the apparatus described is that as a matter of fact all of the carbon dioxide, which has developed in the milk being churned is expelled therefrom, so that the acidity of the cultured butter milk produced is not increased by carbondioxide residues.

It is possible, therefore, to have the acidification process continued to the end before the liquid is supplied to the churning apparatus, without too acid a final product being obtained. This is an important advantage as thus the ultimate acidity is entirely under control, there being no risk of the acidification continuing afterwards without it being possible to check this.

I claim:
1. An apparatus for churning skim milk to produce buttermilk, comprising a substantially cylindrical casing, the axis of which is horizontal and having a supply line at the one end wall and a discharge line at the other end wall, a shaft generally extending axially through the interior of the casing, at least one end of the shaft extending through an end wall of the casing and adapted to be coupled with a driving mechanism, a plurality of supporting means distributed along the length of the shaft and secured to said shaft, said supporting means each having a circular row of cup-shaped ladling means thereon normal to the shaft, each ladling means being open in the direction in which the shaft rotates, a plurality of vertical partitions in said casing, one partition between each adjacent set of circular rows of ladling means, said partitions extending upwardly from the semi-cylindrical bottom of the casing to a point a short distance beneath the shaft, and a plurality of gutters, one gutter above each partition, said gutters being secured against the portion of the upper wall of the casing along which the ladling means move downwardly, each gutter extending a direction substantially parallel to the axis of the casing and being slightly downwardly inclined in the direction from the supply line to the discharge line.

2. An apparatus for churning skim milk to produce buttermilk, comprising a substantially cylindrical casing, the axis of which is horizontal and having a supply line at the one end wall and a discharge line at the other end wall, a shaft generally extending axially through the interior of the casing, at least one end of the shaft extending through an end wall of the casing and adapted to be coupled with a driving mechanism, a plurality of supporting means distributed along the length of the shaft and secured to said shaft, said supporting means each having a circular row of cup-shaped ladling means thereon normal to the shaft, each ladling means being open in the direction in which the shaft rotates, a plurality of vertical partitions in said casing, one partition between each adjacent set of circular rows of ladling means, said partitions extending upwardly from the semi-cylindrical bottom of the casing to a point a short distance beneath the shaft, and a plurality of gutters, one gutter above each partition, said gutters being secured against the portion of the upper wall of the casing along which the ladling means move downwardly, each gutter extending a direction substantially parallel to the axis of the casing and being slightly downwardly inclined in the direction from the supply line to the discharge line, and a plurality of shafts, one for each gutter, said shafts extending through and supported in the wall of the casing, each of said shafts being provided with an operating means and a locking means and one of said gutters mounted on each shaft.

3. A method of churning skim milk which comprises passing said skim milk into a first of a series of vessels, ladling the skim milk up out of the said first vessel and pouring it out again at some distance above the level of the liquid, passing a portion of the poured out skim milk into the next vessel in the series and returning the remainder of the poured out skim milk to the vessel from which it was picked up, ladling the skim milk in the succeeding vessels simultaneously, passing a portion of the liquid ladled up from each vessel continuously to a successive vessel of the series, and discharging the thus churned skim milk from the last vessel of said series.

References Cited in the file of this patent
UNITED STATES PATENTS

| | | |
|---|---|---|
| 2,295,258 | Cann | Sept. 8, 1942 |
| 2,650,804 | Marco | Sept. 1, 1953 |
| 2,721,062 | Nanz | Oct. 18, 1955 |